United States Patent [19]

Fowler

[11] Patent Number: 4,611,295
[45] Date of Patent: Sep. 9, 1986

[54] SUPERVISORY CONTROL SYSTEM FOR MICROPROCESSOR BASED APPLIANCE CONTROLS

[75] Inventor: Daniel L. Fowler, Kentwood, Mich.

[73] Assignee: Robertshaw Controls Company, Richmond, Va.

[21] Appl. No.: 750,066

[22] Filed: Jun. 28, 1985

Related U.S. Application Data

[63] Continuation of Ser. No. 382,970, May 28, 1982, abandoned.

[51] Int. Cl.⁴ .............................................. G05B 9/02
[52] U.S. Cl. .................................... 364/184; 364/138;
 364/141; 371/62; 307/86; 307/442; 307/518;
 307/234; 307/132 E; 340/507; 361/78; 361/83
[58] Field of Search ............... 364/138, 140, 141, 184,
 364/186; 371/15, 20, 24, 62; 307/38, 85, 86, 132
 E, 141, 141.4, 234, 442, 518; 361/78, 83;
 340/506, 507, 812, 825.16

[56] References Cited

U.S. PATENT DOCUMENTS

| 3,903,474 | 9/1975 | Wiley | 371/62 |
|---|---|---|---|
| 3,934,131 | 1/1976 | Perschy | 371/62 |
| 3,958,126 | 5/1976 | Bryant | 340/512 |
| 4,072,852 | 2/1978 | Hogan et al. | 364/900 |
| 4,115,847 | 9/1978 | Osder et al. | 364/186 |
| 4,118,792 | 10/1978 | Struger et al. | 371/20 |
| 4,158,432 | 6/1979 | van Bavel | 371/20 |
| 4,245,309 | 1/1981 | Kiefer | 364/186 |
| 4,254,473 | 3/1981 | Goldun et al. | 364/184 |
| 4,275,464 | 6/1981 | Schmidt | 364/186 |
| 4,287,565 | 9/1981 | Haubner et al. | 364/186 |
| 4,365,289 | 12/1982 | Small et al. | 364/144 |
| 4,398,233 | 8/1983 | Bala et al. | 364/186 |
| 4,409,635 | 10/1983 | Kraus | 364/186 |
| 4,420,669 | 12/1983 | Scalf et al. | 219/10.55 B |
| 4,434,403 | 3/1984 | Chang | 307/518 |
| 4,446,437 | 5/1984 | Rinaldi | 307/442 |
| 4,481,393 | 11/1984 | Ueda | 219/10.55 B |
| 4,482,845 | 11/1984 | Roylance et al. | 307/234 |
| 4,491,905 | 1/1985 | Arakawa | 364/184 |

Primary Examiner—Jerry Smith
Assistant Examiner—John R. Lastova
Attorney, Agent, or Firm—James A. Wong

[57] ABSTRACT

A supervisory control system for microprocessor based appliance controls, the supervisory control system incorporating means for detecting dynamic failure of a microprocessor incorporated in the appliance control, means for disabling the high energy circuits in the associated appliance if the microprocessor is not operating in a normal mode and switch means requiring a physical or mechanical operation to enable energization of the high energy circuits of the associated appliance whereby the high energy circuits of the associated appliance are disabled unless at least two predetermined criteria are met.

18 Claims, 1 Drawing Figure

4,611,295

SUPERVISORY CONTROL SYSTEM FOR MICROPROCESSOR BASED APPLIANCE CONTROLS

This application is a continuation, of application Ser. No. 382,970, filed May 28, 1982 and now abandoned.

BRIEF SUMMARY OF THE INVENTION

This invention relates to microprocessor based electronic controls for household appliances and, more particularly, to an improved supervisory control system for microprocessor based appliance controls.

Heretofore, microprocessor based electronic controls have been utilized for controlling a wide variety of household appliances such as microwave ovens, dishwashers, washing machines, television sets and other appliances. Such microprocessor based appliance controls have become increasingly sophisticated as a result of the increasing versatility and capabilities of microprocessors which are programmed to perform a multitude of functions with integrated circuit components. The universal self diagnosing appliance control disclosed in U.S. Pat. No. 4,275,464, issued June 23, 1981 to David J. Schmidt and assigned to the assignee of the present invention is typical of such sophisticated appliance controls. However, environmental conditions and other factors sometimes cause the microprocessors themselves to scramble, that is, the microprocessor does not operate its programs in proper sequence.

An object of the present invention is to provide an improved supervisory control system for microprocessor based appliance controls which provides a dynamic check under operating conditions of the microprocessor incorporated in the control.

Another object of the present invention is to provide a supervisory control system for microprocessor based appliance controls which requires a physical or mechanical operation to enable the high energy circuits of the appliance.

Another object of the invention is to provide a supervisory control system which incorporates improved means for detecting dynamic failure of a microprocessor incorporated in an appliance control.

Another object of the invention is to provide an improved supervisory control system which inhibits the output relay driver circuit of a microprocessor based appliance control unless at least two predetermined criteria are met.

Another object of the invention is to provide an improved supervisory control system for microprocessor based appliance controls which disables the high energy circuits in an appliance if the microprocessor incorporated in the control is not operating in a normal mode.

Another object of the invention is to provide an improved supervisory control system for microprocessor based appliance controls which is not adversely affected by microprocessor output static conditions.

Another object of the invention is to provide an improved supervisory control system which provides improved appliance control and which is economical to manufacture and assemble.

Another object of the present invention is to provide an improved supervisory control system incorporating improved means for controlling appliance operation and assuring fail safe operation of the appliance control and associated appliance.

The above as well as other objects and advantages of the present invention will become apparent from the following description, the appended claims and the accompanying drawing.

DETAILED DESCRIPTION

Figure 1:
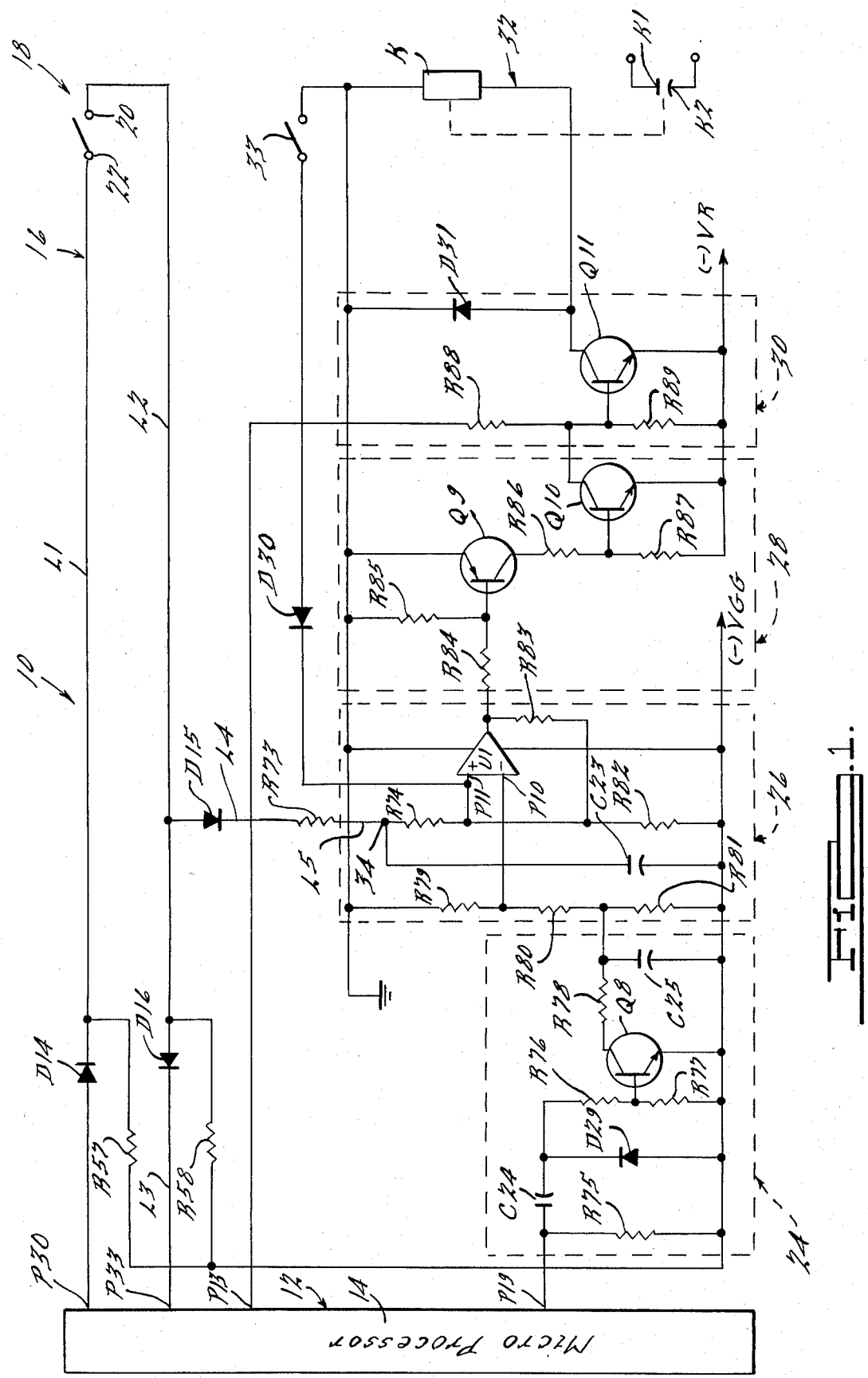
FIG. 1 is a schematic circuit diagram of a supervisory control system embodying the present invention, showing the same applied to a microprocessor based appliance control.

Referring to the drawing, a preferred embodiment of the present invention is schematically illustrated therein and is comprised of a supervisory control system, generally designated 10, particularly adapted for use in supervising a microprocessor based appliance control, generally designated 12, only portions of which are illustrated so as to show the connection of the present invention therewith. The microprocessor based appliance control 12 includes a conventional microprocessor 14 which may be of any desired type and the control 12 may, for example, be of the type disclosed in the aforementioned U.S. Pat. No. 4,275,464 which is particularly adapted to control a microwave oven although it will be understood that the present invention is applicable to other uses. For example, supervisory control systems embodying the present invention may be applied to other microprocessor based appliance controls, such as microprocessor based controls for dishwashers, washing machines, dryers, television sets and other appliances.

In the embodiment of the invention illustrated, the supervisory control system 10 is adapted to be connected to conventional power supplies, such as a −10 volt DC power supply −VGG and a −27 volt DC power supply −VR supplied by any desired or conventional means incorporated in the appliance control 12. The system 10 is comprised of a start switch circuit, generally designated 16, which includes a start switch 18 that may be a part of a conventional push button keyboard or the start switch may be a rotary switch or other switching means associated with the appliance being controlled. The switch 18 is preferably of a type requiring the application of manual or other physical force to effect closure of the normally open contacts 20 and 22 incorporated therein. The start switch circuit 16 also includes resistors R57, R58 and R73, and diodes D14, D15 and D16.

In addition, the system 10 includes a band pass filter circuit, generally designated 24, comprised of a transistor Q8, capacitors C24 and C25, a diode D29 and resistors R75, R76, R77 and R78. An electronic latch and missing pulse detector circuit, generally designated 26, is also incorporated in the system 10 as well as an inhibit circuit, generally designated 28, a relay driver circuit, generally designated 30, and a power relay circuit, generally designated 32, the electronic latch and missing pulse circuit 26 including a comparator U1, a capacitor C23 and resistors R74, R79, R80, R81, R82 and R83, while the inhibit circuit 28 is comprised of transistors Q9 and Q10 and resistors R84, R85, R86 and R87. The relay driver circuit 30 is comprised of a transistor Q11, diode D31 and resistors R88 and R89, while the power relay circuit 32 includes a DC relay K having normally open contacts K1 and K2, a test switch 33, and a diode D30. The various components of the above described circuitry are all electrically connected, by suitable conductors, as illustrated in the drawing and as will be described hereinafter in greater detail.

The system 10 is adapted to provide control, supervision and safety shutdown of the output DC relay K of the appliance control in the event the microprocessor 14 scrambles and does not operate its program in the proper sequence, the output relay K, in turn, controlling the high energy circuitry of the appliance being controlled, such as magnetron circuitry, browner circuitry, fan or other motor circuitry, stirrer circuitry and other high energy circuitry.

The microprocessor 14 is programmed to supply a pulsed ground signal at the pin P30 thereof. Such pulsed ground signal may be in the form of a square wave or other AC type signal which also drives the grid of the colon of a conventional four digit, multiplexed vacuum florescent Arabic numeral display (not shown) for the appliance being controlled. The pin P30 is connected to the contact 22 of the switch 18 through the diode D14 by the lead L1, while the contact 20 of the switch 18 is connected by the lead L2, the diode D16 and the lead L3 to the pin P33 of the microprocessor 14. The contact 20 of the switch 18 is also connected by the lead L2, the diode D15, the lead L4, the resistor R73, and the lead L5 to the node 34.

When the contacts 20 and 22 of the switch 18 are closed, a pulse emanating from the pin P30 of the microprocessor is supplied to the input pin P33 of the microprocessor and the microprocessor is programmed to then start emitting pulses from the pin P19 thereof. The pulses emanating from the pin P19 are AC coupled through the capacitor C24 into the base of the transistor Q8 which in turn discharges the capacitor C25 so that at the positive terminal of the capacitor C25 the voltage is essentially −10 volts DC. There is a voltage divider from the positive side of the capacitor C25 to the ground of the power supply and when the voltage divider establishes a bias at the negative pin P10 of the comparator U1, that voltage bias is approximately two-thirds of the regulated power supply −VGG. The positive pulse from the start switch 18 is also transmitted to the positive input of the comparator U1, pin P11. Such pulse also goes through the resistor R73 and charges up the capacitor C23. Such RC network is used as a storage reservoir for the pulse, that is to say, the pulse is allowed to charge up the capacitor C23 to hold the signal level there so that if a person very quickly closes the contacts of the switch 18, it acts as a pulse stretcher and allows time for the microprocessor 14 to send out a pulse from the pin P19 which in turn discharges the capacitor C25. When the capacitor C23 is charged to approximately ground potential, the positive voltage of the input P11 of the comparator U1 is much greater than the voltage that is established at the negative input P10 of the comparator. Such condition will cause the output of the comparator to go to a one state which in turn turns off the transistor Q9 and the transistor Q9 in turn turns off the transistor Q10 and allows the transistor Q11 to turn on if the microprocessor 14 is putting out a signal on the pin P13.

The diode D16 prevents erroneous positive pulses from the microprocessor pin 33 from being conducted to the positive input of the comparator U1, pin P11. Therefore, the only means of conducting positive pulses to the positive input of the comparator U1, pin P11, is through the contacts of the start switch 18 which requires a physical or mechanical operation.

When the output of the comparator goes to the high state it also provides a latched bias level on the positive input of the comparator, Pin P11. This bias level is approximately one-third of the regulated power supply −VGG. At this point the system 10 is latched in a state that will allow the relay K and the relay driver to be operated and turned on and off by signals emanating from the microprocessor pin P13 whereby the microprocessor controls the output relay and the associated appliance in accordance with the programmed schedule of the microprocessor.

The comparator U1 will remain latched as long as signals of proper frequency are generated by the microprocessor and supplied out of the output pin P19. Each pulse that comes out of the microprocessor on the pin P19 is AC coupled through the capacitor C24 into the base of the transistor Q8. Each pulse that is at the right repetition rate then comes through and turns on the transistor Q8 which will discharge the capacitor C25 and effectively keep the capacitor C25 discharged so that the negative bias on the pin P10 of the comparator U1 is approximately two-thirds of the regulated power supply voltage −VGG.

If the pulses supplied by the microprocessor 14 terminate, then the capacitor C25 no longer is discharged by the transistor Q8 and the bias level on the negative input of the comparator U1, pin P10, begins to decrease in a ramp wave form until it drops below one-third of the regulated power supply voltage −VGG which is the voltage on the positive input of the comparator U1, pin P11. At this point, the comparator U1 changes states again to the zero state which in turn turns on the transistor Q9 which turns on the transistor Q10 which inhibits or turns off the transistor Q11 thereby dropping out the relay K. The only way that this latched circuit can be restarted or latched up again is if the process is repeated and another pulse is supplied which requires mechanical operation through the start switch 18. The reason for this is that the positive input of the comparator U1, pin P11, is biased to the negative supply −VGG, and the bias that will be on the negative input of the comparator U1, pin P10, will be less due to the voltage divider comprising the resistors R79, R80 and R81 or in some cases the resistor R81 will be an AC short circuit to the minus power supply −VGG. In such case, the positive input P11 of the comparator U1 is negatively biased with respect to the negative input of the comparator U1, pin P10, and this will keep the comparator U1 in an unlatched state. If the signals continue to emanate from the microprocessor on the output pin P19, these pulses will keep the capacitor C25 discharged. Due to the voltage divider action provided on the resistors R79 and R80, the negative input of the comparator U1, pin P10, will be more positive than the positive input on the comparator U1, pin P11, so that scrambled signals emanating from the microprocessor will have no ability to relatch the comparator. The condition required to relatch the comparator U1 is a positive pulse that comes through the start switch 18 and is transmitted through the diode D15 to the resistor R73 which charges up the capacitor C23 and then passes through the resistor R74 directly to the positive pin of the comparator U1, pin P11, and when that occurs the comparator U1 can be relatched.

As previously mentioned, the present invention also stops or inhibits the output relay K when the microprocessor 14 goes into a scrambled mode. In some cases, when the microprocessor goes into a scrambled mode, the frequency emanating from the output pin P19 is very high. This is discriminated against by using a low pass filter, the low pass filter being comprised of the capacitor C24 and the resistors R75, R76 and R77. The charge path of the capacitor C24 has a much lower impedance than the discharge path, the charge path of the capacitor C24 being from the output of the microprocessor, pin P19, through the capacitor, through the resistors R76 and R77 to the base emitter of the transistor Q8 and to the negative power supply, −VGG. The discharge of the capacitor C24 is through the resistor R75 to the negative rail of the power supply −VGG and through the diode D29, anode to cathode, and back to the other side of the capacitor C24.

The pulses emanating from the microprocessor pin P19 are positive pulses that are switched through a MOSFET channel to the positive pin of the power supply, which is ground. In a sense, this is similar to a rectified pulse that would come through a diode. If the pulse rate of the signal emanating from the microprocessor pin P19 is much faster than the discharge path of the capacitor C24, then the capacitor C24 will begin to build a positive going charge across it. If the pulse repetition rate of the microprocessor signal emanating from the pin P19 is much greater than the discharge time of the capacitor C24, the capacitor C24 will charge up to a sufficient amount that it will no longer pass a sufficient signal from the microprocessor pin P19 through the capacitor into the resistor R76 and into the base of the transistor Q8 to turn it on. Thus the transistor Q8 turns off which allows the capacitor C25 to charge up so that the bias at the negative pin of the comparator U1, pin 10, exceeds the bias of the positive input of the comparator U1, pin P11, and thereby unlatches the comparator U1 which in turn causes the output relay driver transistor Q11 to be inhibited or turned off.

It will be understood that the relay K controls all of the high energy components in the appliance, such as a microwave oven. The contacts of the relay K are normally open, one side of the normally open contacts tying to the AC power line, and all energy that is supplied to components such as the fan, the magnetron circuit, and other AC power circuits, will pass through the contacts K1 and K2 of the relay K. If the relay K is inhibited from turning on and closing its normally open contacts, then all of the high energy circuits in the appliance are maintained in a safe mode.

It will be understood that in the latched condition, the output of the comparator U1 is in a high state. The comparator U1 itself has an open collector output and when the comparator is in a high state, the transistor inside the comparator which goes to the −VGG power supply is turned off. When that occurs, then the positive voltage of the power supply, which is ground, is conducted through the resistor R85 to the base of the transistor Q9 and this pulls the voltage at that point to a level such that the transistor Q9 is allowed to turn off. When the transistor Q9 turns off, it allows the voltage at the base of the transistor Q10 to be biased to the minus power supply for the relay which is −27 volts DC, and it also turns off. When the transistor Q10 is turned off, then a positive signal emanating from Pin P13 of the microprocessor is allowed to turn on the transistor Q11. If the transistor Q10 is turned on, which is the inhibit state, it shorts out the signals emanating from the microprocessor pin P13. When the transistor Q11 turns on, the relay K turns on to energize the high energy AC power circuitry by closing the contacts K1 and K2.

The diode D31 is a snubber diode and when there is an inductive load, such as a DC relay, the inductance can generate a positive going spike when the current passing through the relay is released. This positive going spike is conducted through the diode D31 back to the ground on the power supply, which prevents electromagnetic interference type noise from feeding back into the system 10 and also prevents a high voltage pulse that might cause the transistor Q11 to break down and possibly fail.

It will be understood that the test switch 33 is located so that it is inaccessible to users of the appliance and is only accessible to manufacturing and field service personnel for test purposes. Closing of the test switch 33 by manufacturing or field service personnel forces the comparator U1 into a latched condition whereby the transistor Q9 turns off which turns off the transistor Q10 and allows the transistor Q11 to turn on as a function of the signals emanating from the pin P13 of the microprocessor. On the other hand, users of the appliance can only energize the high energy circuits of the appliance by actuating the start switch 18 in the manner previously described.

An identification of and/or typical values for the components of the system 10, which are described hereinabove, are as follows:

| | |
|---|---|
| U1 | Comparator, LM339 |
| Q8 | Transistor, 2N2222A |
| Q9 | Transistor, 2N3906 |
| Q10 | Transistor, 2N2222A |
| Q11 | Transistor, 2N2222A |
| C23 | Capacitor, .47 mfd |
| C24 | Capacitor, .1 mfd |
| C25 | Capacitor, 2.2 mfd |
| D14 | Diode, 1N4148 |
| D15 | Diode, 1N4148 |
| D16 | Diode, 1N4148 |
| D29 | Diode, 1N4148 |
| D30 | Diode, 1N4148 |
| D31 | Diode, 1N4148 |
| R57 | Resistor, 47K mfd |
| R58 | Resistor, 47K mfd |
| R73 | Resistor, 1000 ohm |
| R74 | Resistor, 10K ohm |
| R75 | Resistor, 4.7K ohm |
| R76 | Resistor, 4.7K ohm |
| R77 | Resistor, 2.2K ohm |
| R78 | Resistor, 100 ohm |
| R79 | Resistor, 100K ohm |
| R80 | Resistor, 47K ohm |
| R81 | Resistor, 470K ohm |
| R82 | Resistor, 100K ohm |
| R83 | Resistor, 47K ohm |
| R84 | Resistor, 4.7K ohm |
| R85 | Resistor, 2.2K ohm |
| R86 | Resistor, 27K ohm |
| R87 | Resistor, 2.2K ohm |
| R88 | Resistor, 4.7K ohm |
| R89 | Resistor, 2.2K ohm |

It will be understood, however, that these identifications and values may be varied depending upon the particular application of the principles of the present invention.

While a preferred embodiment of the invention has been illustrated and described, it will be understood that various changes and modifications may be made without departing from the spirit of the invention.

What is claimed is:

1. A power relay for operating an appliance in combination with a supervisory control system for providing control, supervision and safety shutdown of the output of said power relay, said supervisory control system comprising in combination:
   a. a microprocessor including an input terminal and a pair of output terminals conditioned to generate control signals at said output terminals upon receipt of a signal at said input terminal;
   b. manually or force actuated start switch means connected to a source of potential and to said input terminal;
   c. electronic latch and missing pulse detector means including a comparator connected to both said switch means and one of said output terminals;
   d. inhibit means connected to said electronic latch and missing pulse detector means and controlling energization of said power relay; and
   e. relay driver means connected to said power relay and the other of said output terminals to control energization of said power relay;

wherein when said switch means is closed, control signals emitted from said microprocessor are AC coupled through said electronic latch and missing pulse detector means, said inhibit means, and said relay driver means to control the output of said power relay.

2. The combination as set forth in claim 1 including band pass filter means connected between said electronic latch and missing pulse detector means and said one output terminal.

3. The combination as set forth in claim 1, said switch means requiring the application of physical force thereto to effect closure thereof.

4. The combination as set forth in claim 1, said electronic latch and missing pulse detector means including voltage divider means connected to said comparator.

5. The combination as set forth in claim 1 including an RC network connected to said comparator.

6. The combination as set forth in claim 1, said inhibit means including a first transistor connected to the output of said comparator and a second transistor controlled by said first transistor and connected to said relay driver means.

7. The combination as set forth in claim 1, said relay driver means including solid state means connected between said other output terminal of said microprocessor and said power relay means.

8. The combination as set forth in claim 7 including snubber diode means connected between said power relay means and ground.

9. A power relay for operating an appliance in combination with a supervisory control system for providing control, supervision and safety shutdown of the output of said power relay, said supervisory control system comprising in combination:
   a. a microprocessor including an input terminal, a pair of output terminals, and a pulsed ground source;
   b. manually actuatable switch means connected between said pulsed ground source and said input terminal;
   c. a band pass filter circuit connected to one of said output terminals;
   d. an electronic latch and missing pulse detector circuit including a comparator connected to both said switch means and said band pass filter circuit;
   e. inhibit means connected to said electronic latch and missing pulse detector circuit and said power relay; and
   f. a relay driver circuit connected to said power relay and the other output terminal of said microprocessor, with said microprocessor being conditioned so that control signals are generated at said output terminals upon receipt of a signal at said input terminal from said pulsed ground source when said switch means is closed, said control signals being AC coupled through said band pass filter circuit, said electronic latch and missing pulse detector circuit, said inhibit means, said relay driver circuit to provide control, supervision and safety shutdown of the output of said power relay.

10. The combination as set forth in claim 9, said electronic latch and missing pulse detector circuit including voltage divider means connected between said comparator and said band pass filter circuit.

11. The combination as set forth in claim 10 including as RC network comprising a capacitor and a resistor connected to said comparator.

12. The combination as set forth in claim 11, said inhibit circuit including a first transistor connected to the output of said comparator and a second transistor controlled by said first transistor and connected to said relay driver circuit.

13. The combination as set forth in claim 12, said relay driver circuit including solid state means connected between said other output terminal of said microprocessor and said output relay.

14. The combination as set forth in claim 13 including a snubber diode connected between said power relay and ground.

15. A power ralay for operating an appliance in combination with a supervisory control system for providing control, supervision and safety shutdown of the output of said power relay, said supervisory control system comprising in combination:
   a. a microprocessor including an input terminal, a pair of output terminals, and a pulsed ground source;
   b. a negative DC power supply;
   c. a manually actuatable switch connected between said pulsed ground source and said input terminal;
   d. a band pass filter circuit connected to said power supply and to one of said output terminals;
   e. an electronic latch and missing pulse detector circuit including a comparator having a negative terminal, a positive terminal, and an output with said positive terminal being connected to said switch;
   f. an RC network comprising a capacitor and a resistor connected to said positive terminal of said comparator;
   g. inhibit means connected to said output of said comparator and said power relay; and
   h. a relay driver circuit including solid state means connected to said power relay and the other output terminal of said microprocessor;

wherein said microprocessor conditioned to generate control signals at said output terminals upon receipt of a pulsed ground signal at said input terminal and said pulsed ground source when said switch is closed, said control signals generated at said output terminals being AC coupled through said band pass filter circuit, said electronic latch and missing pulse detector circuit, said RC network, said inhibit means, and said relay driver circuit to provide control, supervision, and safety shutdown of the output of said power relay.

16. The combination as set forth in claim 15, said inhibit circuit including a first transistor connected to said output of said comparator and a second transistor controlled by said first transistor and connected to said solid state means in said relay driver circuit.

17. The combination as set forth in claim 16 including a snubber diode connected between said power relay and ground.

18. The combination as set forth in claim 17 including a capacitor coupling said band pass filter circuit to said one output terminal of said microprocessor.

* * * * *